June 17, 1969     W. P. JOHNSON III     3,451,040
SPRING SUSPENSION FOR A LOW-FREQUENCY GEOPHONE
Filed March 21, 1967
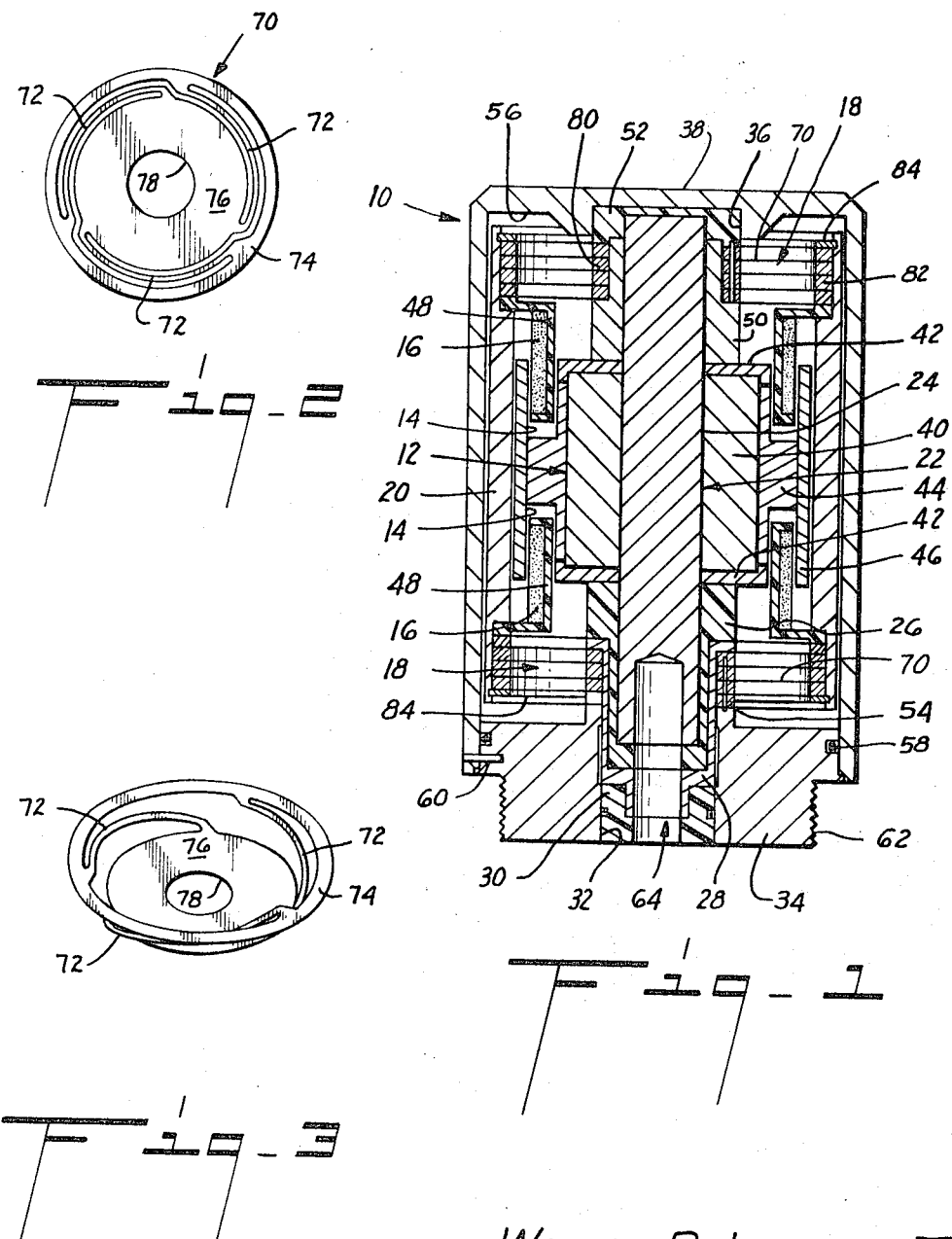
WALTER P. JOHNSON, III
INVENTOR.
BY Browning, Demms, Hyer & Eickenroht
ATTORNEYS

United States Patent Office 3,451,040
Patented June 17, 1969

3,451,040
SPRING SUSPENSION FOR A LOW-FREQUENCY GEOPHONE
Walter P. Johnson III, Houston, Tex., assignor to Mark Products, Inc., Houston, Tex., a corporation of Texas
Filed Mar. 21, 1967, Ser. No. 624,842
Int. Cl. G01v 1/16
U.S. Cl. 340—17　　　　　　　14 Claims

ABSTRACT OF THE DISCLOSURE

A moving coil, electromagnetic-type seismometer in which a pair of balanced coils are concentrically suspended in annular air-gaps of a permanent magnetic field by means of a spring suspension system that permits the coils a freedom of movement only coaxial with the axis of the air-gaps, the spring suspension system being formed of a plurality of spaced spring-spiders attached to each end of the coil assembly.

Background of the invention

This invention relates to seismometers, and more particularly to a spring suspension system for low-frequency seismometers.

Seismometers, or geophones as they are commonly known in the oil exploration industry, are used extensively in seismic surveying to convert seismic oscillations of the earth into electrical signals. In seismic surveying, a seismic disturbance is generated by explosives or other means and the resulting seismic waves after refraction and/or reflection from subsurface formations are detected by geophones located ether on the surface of the earth or in boreholes. In seismic surveying, the vibrations of interest range from about 5 to 100 c.p.s. for refraction surveys, and from 10 to 150 c.p.s. for reflection surveys. Present-day geophones, which have evolved from instruments originally employed for earthquake detection, detect earth movements as small as $10^{-8}$ inches.

Although there have been numerous types of seismometers developed and used, the most common type presently in use in the electromagnetic, moving coil type which consists of a coil and a magnet, one rigidly fixed with respect to the earth and the other suspended from a fixed support by a spring. Relative motion between the coil and the magnet produces an electromotive force across the terminals of the coil which is proportional to the velocity of the motion. Accordingly, mechanical movement is converted into equivalent electrical energy. In the moving coil type of electromagnetic seismometer, the coil is usually the inertial element and is suspended by springs in an annular air-gap of a constant magnetic field. When a seismic disturbance causes the earth to move, the magnet and support also move. However, the mass and coil tend to remain stationary and lag behind the motion of the earth; and, therefore, there is relative motion between the coil and the magnetic field which produces a resultant voltage proportional to the velocity of the motion. In order for the geophone to produce a linear response, a given increment of earth displacement should result in a definite amount of coil movement throughout the useful range of the geophone. Accordingly, it is essential that the spring suspension system be designed and constructed so that it provides a linear movement within the operating range of the geophone.

Oil exploration-type geophones use a spring suspension system formed of a pair of spring-spiders, each of which is formed from an initially flat disk having several spring arms formed by etching. The spring-spider is preformed, which provides vertical displacement when it is unassembled. Upon assembly with the mass, the spring-spiders return to a flat position. In order to support the inertial mass and coil in all directions, a pair of such spring-spiders is used. In some constructions, one spring-spider is located at each end of the assembly and in other constructions both spring-spiders are at one end.

The oil exploration-type geophone utilizing a spring-spider suspension system has many advantages for any transducer service since it is rugged and operates under extreme environmental conditions. In addition, it provides a wide band response. Accordingly, it is desirable to use such type of construction for low-frequency seismometers.

The natural frequency of a geophone is determined by:

$$f = \frac{1}{2\pi}\sqrt{K/M} \qquad \text{(Eq. 1)}$$

where $f$ is the resonant frequency
M is the weight of the inertial mass
K is the spring constant of the system.

In order to decrease the frequency of a geophone it is necessary to either increase the weight of the mass, decrease the stiffness of the spring system or a combination of the two. However, the two variables work in opposition to each other. In other words, if the stiffness of the spring system is decreased, it is more difficult for the spring system to support the weight of the mass or an increased mass.

It has been found in practice that stable geophones require a spring-spider diameter of approximately 1 inch per 0.1 second/cycle. Utilizing such an empirical formula, the diameter of a low-frequency geophone, i.e., 2 c.p.s., would be increased to an undesirable limit and be too large for insertion in a seismic surveying borehole.

An important parameter of any geophone is its output or transduction constant. In other words, the electrical output must be of sufficient magnitude so that it can be properly recorded. The transduction constant of a geophone is derived from the classical equation:

$$E = BLV \cdot 10^{-8} \qquad \text{(Eq. 2)}$$

which may be transposed to $$G = E/V = BL \cdot 10^{-8} \qquad \text{(Eq. 3)}$$

where

E=Volts
B=Flux density-gauss
L=Conductor length-cm.
V=Velocity (speed)-cm./second
G=Transduction constant-volts/cm./second.

There are several conditions which must be met for a low-frequency geophone. First, geophones are velocity sensitive above resonance; therefore, the transduction power is proportional to the frequency squared for a given displacement. Since microseisms are largely of a constant displacement nature, the geophone power transduction constant needs to be considerably increased as the natural frequency is decreased in order to maintain a satisfactory signal level. To increase the output for a given factor of dampening, the suspended mass must be increased. The suspended mass must also be increased to prevent excessive Brownian noise. All of these factors tend to make the design of the spring suspension system most difficult.

The spring-spider is preformed a determined amount depending upon the desired natural frequency, that is, the spring-spider is heat treated to provide a vertical displacement. When the suspended mass is attached, the spring-spider is displaced by this same amount back to the flat position. Therefore, at gravity with the mass attached, the spring-spiders will be flat. As the natural frequency is lowered, the amount of preform increases and the stress in the spring-spider increases. For example, the mass in a 2-cycle geophone deflects at the rate of approximately 2½″/g. Therefore, in order to obtain a linear response over the entire range the springs would have to be preformed approximately 2½″. Even though it is not necessary to have a linear response over the full range, it can be seen that a considerable amount of preform is necessary in order to have a sufficiently large band range of linear response. If the diameter of the spring-spider is held constant, the amount of preforming necessary may result in excessive stress and subsequent failure. In addition to high spring stress, the spring-spiders of a low-frequency geophone often operate close to metastability with the result that movement of the mass in response to seismic oscillations is less and less linear.

It is the object of the present invention to provide a novel spring suspension system for a seismometer which will permit the construction of a small-diameter low-frequency seismometer that is stable in operation, that does not approach metastability, that utilizes spring-spiders in which the stresses are greatly minimized, that produces a linear response over a wide band operating range, while at the same time the power transduction constant of the geophone is maintained to provide a desired signal level.

Summary of the invention

The spring suspension system of the present invention may be utilized in any transducer in which one element is fixed to a support and a second element is suspended by springs to move relative to the first element.

The spring suspension system utilizes a plurality of spring-spiders of the type commonly used in oil exploration-type geophones. Instead of using a single pair of such spring-spiders, the spring suspension system uses a plurality of spaced spring spiders with no one spring-spider being capable of supporting one-half of the suspended mass. The thickness of each individual spring-spider is a fraction of the thickness which would be required if a single pair were used. Accordingly, the stresses in each individual spring-spider is well within the maximum stress allowable for such spring-spider and the spring-spiders do not approach a metastable condition.

With such a construction, the spring suspension system can be of the compliance necessary to produce a low-frequency geophone while at the same time support a mass sufficient to produce the desired transduction constant. Moreover, the diameter of the geophone can be maintained at a sufficiently small size to permit the geophone to be used in seismic boreholes. Further, the stresses in individual spring-spiders are maintained at a minimum and do not exceed the proportional elastic limit of the material used; therefore, a stable geophone with linear response over a wide band width is produced.

Brief description of the drawings

FIG. 1 is a cross-section of a moving coil, electromagnetic seismometer incorporating the novel spring suspension of the present invention;

FIG. 2 is a plan view of a spring-spider used in the spring suspension system;

FIG. 3 is an isometric view of the spring-spider illustrated in FIG. 2 after it has been preformed.

Description of the preferred embodiment

It should be understood that the seismometer of the present invention, although particularly well adapted for detecting seismic waves, can, of course, be used to detect vibrations or movements in any type of material with which it is in contact. Such other applications of the device of the present invention will be readily understood by those skilled in the art and it is not intended that the present invention be limited solely to seismometers for detecting seismic waves. The general principles of the present invention have broader application.

Moreover, the present invention is directed primarily to a spring suspension system and, while the preferred embodiment illustrates the invention incorporated in a moving coil, electromagnetic seismometer, it is to be understood that the principle of the invention may be used in other types of transducers in which one spring-suspended element moves relative to another.

As illustrated in FIG. 1, a moving coil, electromagnetic seismometer, which is designated generally by 10, is formed of a permanent magnet 12 having annular air-gaps 14—14 in which a pair of balanced coils 16—16 are concentrically suspended by a spring suspension system 18 whereby the coils 16—16 have a freedom of movement substantially only in the direction of the axis of the air-gaps 14—14. The spring suspension system 18 also supports mass 20 which, together with the coils 16—16, form the inertial mass. The mass-coil assembly surrounds the magnet 12 which is attached to a support rod 22 rigidly fixed with respect to the earth. The mass-coil assembly is maintained concentric with the support rod 22 and magnet 12 by the spring suspension system 18 the inner end of which is anchored to the support rod 22.

The support rod assembly 22 preferably formed of a cylindrical rod 24 and open-ended cup-shaped elements 26 and 28 and bushing 30 receive the permanent magnet assembly 12 that is mounted thereon, see FIG. 1. One end of the support rod assembly 22 is positioned in an aperture 32 of a plate 34 and the other end of the support rod assembly 22, when the seismometer is completely assembled, is positioned in an aperture 36 of a cup-shaped casing 38. The support rod assembly 22 forms the central axis of the completed geophone 10.

As can be seen in FIG. 1, the permanent magnet assembly 12 is telescoped over the cylindrical rod 24 of the support rod assembly 22. One end of the magnet assembly 12 abuts against cup-shaped element 26 of the support rod assembly 22. The permanent magnet assembly 12 is formed of an annular permanent magnet 40 which may be "Alnico No. 5." Positioned at each end of the magnet 40 are inner pole pieces 42—42. Surrounding the circumferential surface of the magnet 40 is a gap spacer 44 to which is attached an annular outer pole piece 46. The space between the inner pole pieces 42—42 and the annular outer pole piece 46 defines the annular air-gaps 14—14 through which substantially uniform lines of flux pass.

The coils 16—16 are wound on cylindrical bobbins 48 and positioned in the air-gaps 14—14. The bobbins 48 are attached to the annular inertial mass 20 which surrounds the annular outer pole piece 46. The coils 16—16 which are preferably of humbucking construction, may be wired in series opposition or parallel as desired and well understood by those skilled in the art. The inertial mass 20 and coils 16—16 are held in position relative to the annular air-gaps 14—14 by the novel spring suspension system 18 of the present invention.

The contact rod assembly 22 may act as a conductor; in which case, a spacer 50 which extends between the support rod 22 and the spring suspension system is made of conductive material. An insulating spacer 52 is positioned in aperture 36 of the casing 38 at the end of the support rod 22 and another insulating spacer 54 is positioned between the cylindrical rod 24 and the plate 34. Also, the cup-shaped element 28 and the bushing 30 are formed of non-conducting material. The assembly thus far described is then positioned in the cup-shaped casing 38.

The casing 38 is generally cup-shaped and may be of any suitable material capable of protecting the coil and magnet assembly from physical damage by shock and chemical damage by environmental conditions. In a two-cycle per second geophone built in accordance with the present invention, the casing 38 has a diameter of 3 inches and a height of 4 15/16 inches, which indicates the relative small size of a low-frequency seismometer constructed in accordance with the present invention. The diameter, of course, becomes relatively important when a low-frequency seismometer is used in a borehole.

The plate 34 closes the open end of the cup-shaped casing 38. To provide a seal and thereby exclude the atmosphere from the interior 56 of the casing 38, the plate 34 is provided with a peripheral groove in which is located an O-ring 58 which engages the adjacent interior wall of the casing 38. By use of a dowel pin 60 inserted in mating holes in the casing and plate, the plate 34 may be permanently secured to the casing 38. The outer end of the plate 34 is provided with threads 62 to permit the securing of various types of lead connectors (not shown). Since the support rod assembly 22 acts as a conductor there is a blind hole 64 therein to receive the male member from the lead connector.

The novel spring suspension system 18 is of such construction that it is possible to construct, while maintaining the parameters normally accepted in the seismic industry, a low-frequency, moving coil, electromagnetic geophone that is of a smaller diameter than has previously been obtained, that has a linear response throughout a larger operating range, that is stable within its operating range, and in which the stresses in the individual spring-spiders are maintained at a satisfactorily safe level and in which the transduction constant is maintained at sufficiently high factor to obtain a satisfactory signal level.

The novel spring suspension system 18 utilizes a plurality of typical geophysical springs 70 which are referred to herein as spring-spiders. One of these spring-spiders 70 is fully illustrated in FIGS. 2 and 3. The spring-spider 70 is formed of suitable material such as beryllium-copper and is initially in the form of a relatively thin disk. In order to provide the desired spring construction, portions of the disk are etched away to provide a plurality of spring arms 72 which interconnect an outer annular portion 74 with a central portion 76. A central opening 78 is also etched away to permit the spring-spiders 70 to be telescoped over the support rod assembly 22. By using an etching process, stress within the spring material which may be caused by stamping operations is eliminated. As can be seen in FIG. 2, the spring arms 72 are, in effect, curved spokes which extend in the same direction around the central portion 76 of the spring-spider 70. This is essential since when the spring-spiders flex there is a slight rotation of the coils 16, and if the spring arms 72 were not in the same direction, opposed effects would be obtained to limit relative movement between the coils and the pole pieces of the magnet assembly 12 and produce signal distortion. With this arrangement, a cantilever action is obtained due to the freedom of vertical movement resulting from rotational freedom. Moreover, rotation of the coil 16 in the radial magnetic field induces no voltage and hence causes no undesirable effects. The curved spring arms 72 have a constant strength cantilever cross-section area where they join the outer annular portion 74 and the central portion 76. The coil 16 will remain accurately concentric with the annular air-gap 14 since by virtue of symmetrically disposed curved spring arm 72 equal shortening and lengthening of these spokes relative to the axis along which relative movement between the magnet assembly and the coil occurs, will result with such relative movement only along such axis, thus insuring an active conversion of the vibrations causing such relative movement to electrical signals.

As can be seen in FIG. 1, there are four spring-spiders 70 at each end of the coil mass assembly. The mass 20 is in the form of an open-ended annular cylinder, having a thick central portion and thinner end portions. Adjacent each shoulder formed by the juncture of the thick central portion and the thin end portion, the bobbin 48 of the coil 16 is positioned. A spring-spider 70 which has been telescoped over the support rod assembly 22 is positioned on top of the bobbin 48. A conducting spacer 80 is also telescoped over the support rod assembly 22 and positioned between each two spring-spiders 70. Spacers 82 are positioned between each two spring-spiders 70 at their annular edge. The assembly is then secured to the mass 20 by a snap ring 84 which is engaged with a groove in the inner wall of the mass. Accordingly, it can be seen that the geophone may be easily assembled.

As previously mentioned, the spring-spiders 70 are preformed, that is, they are heat treated to provide an initial upward displacement, see FIG. 3. Upon assembly of the seismometer 10 with the mass in place, the spring-spiders 70 return to their initial flat position, see FIGS. 1 and 2. As the amount of preform increases, the stresses in the spring-spider become excessive resulting in subsequent failure. Therefore, it has been common practice in the oil exploration industry to increase the diameter of the spring-spider 70 to obtain a lower frequency geophone.

A thorough analysis was made of the spring suspension system used in oil exploration type geophones to determine if it would be possible to somehow eliminate the necessity of increasing diameter of the spring-spiders when lowering frequency. It was discovered that if multiple-spaced spring-spiders were utilized not only could the diameter be maintained small but that the overall characteristics of the low frequency would be substantially increased.

The merit factor (M) for springs is given by the following general equation:

$$M \alpha \frac{Y}{S} \qquad \text{(Eq. 3)}$$

where

Y is spring deflection
S is given internal spring stress.

While it is impractical to write the complete equation for the complex spring-spiders 70 commonly used in oil exploration type geophones, the spring-spider 70 may be considered a hybrid between a cantilever and a helix and the stress produced for a given strain or deflection will follow the general form:

$$Y/S = d^2/t \qquad \text{(Eq. 4)}$$

where d is the diameter of the spring (spring length)
t is the thickness of the spring.

For a given weight W (mass on earth) the deflection relation is:

$$W \alpha \frac{t}{Y} \qquad \text{(Eq. 5)}$$

Combining the two relations (Eq. 4 and 5), the following is obtained:

$$\frac{Y^2 W}{S} \alpha d^2 \qquad \text{(Eq. 6)}$$

Therefore, it appeared that the diameter of the spring-spider is a variable defined by the weight and stress for a given value of Y. Since the length of the coil wire was a part of the weight and the stress value could not be increased over the safe stress level of the material used it was the conclusion of the art that the diameter of the spring-spider had to be increased if the frequency was to be decreased.

It was discovered that if the number of spring-spiders were increased, each individual spring-spider would only have to support a proportion of the weight; accordingly, the weight of the mass-coil assembly could be properly maintained with thinner individual spring-spiders 70. Utilizing individually thinner spring-spiders reduces the stress in the individual spring-spiders 70. Therefore, even though each individual spring-spider is preformed the amount necessary to obtain the desired resonance, the stresses in the individual springs are not excessive and do not exceed the proportional elastic limit of the material used.

Accordingly, a low-frequency geophone 10 was constructed which, instead of following the accepted practice of having a pair of spring-spiders 70, used a plurality of spring-spiders 70 at each end of the mass-coil assembly. It was found that even though no individual spring-spider 70 was capable of supporting half of the mass 20 that the plurality of spring-spiders 70 would support the required mass. Moreover, it was found that the diameter of such spring-spiders 70 could be quite small.

Other parameters of the geophone also had to be considered. Ideally, the geophone should be rigid in the lateral direction, that is, at right angles to the motion plane. It has been found that by using multiple spring-spiders the lateral rigidity is substantially increased.

The weight that a spring-spider 70 will support is:

$$W \alpha \frac{bt^3}{d^3} \quad \text{(Eq. 7)}$$

where $b$ is the width of the spring which, if the same deflection rate is maintained and the diameter and width of the spring are held constant, can be reduced to:

$$W \alpha t^3 \quad \text{(Eq. 8)}$$

By using multiple springs the number ($n$) of springs modifies this to:

$$W \alpha n t^3 \quad \text{(Eq. 9)}$$

since W may be considered a constant:

$$t \alpha \frac{1}{\sqrt[3]{n}} \text{ or } n \alpha \frac{1}{t^3} \quad \text{(Eq. 10)}$$

For the lateral deflection ($Y'$) the width ($b$) and the thickness ($t$) are reversed so:

$$Y' \alpha \frac{b^3 t}{d^3} \quad \text{(Eq. 11)}$$

With $b$ and $d$ as constants:

$$Y' \alpha t \quad \text{(Eq. 12)}$$

The rigidity (R) is the inverse of $Y'$ so:

$$R \alpha \frac{1}{t} \quad \text{(Eq. 13)}$$

For multiple springs $$R \alpha \frac{n}{t} \quad \text{(Eq. 14)}$$

Substituting the cube root of $n$ for $t$:

$$R \alpha \frac{n}{\frac{1}{\sqrt[3]{n}}} \text{ or } R \alpha \frac{1}{\sqrt[2]{n}} \quad \text{(Eq. 15)}$$

Therefore, if a single spring, which would be overstressed by the required preforming, was reduced in thickness to one-half of the original value and the original spring replaced by eight, the following would result: The stresses due to deflection would be reduced by a factor of eight. The lateral stresses would remain constant and the lateral rigidity would be increased by a factor of four.

Utilizing the novel spring suspension system, a two-cycle geophone has been constructed which has a frequency tolerance of plus or minus .25 c.p.s., with a distortion of less than .15% at 12 c.p.s. with a driving velocity of .70 inches/second peak. The geophone is only 3 inches in diameter and 4 15/16 inches in height. It uses a suspended mass of 500 grams. The frequency changes less than .1 c.p.s. at a 10° angle and changes less than .1 c.p.s. with a ⅛-inch peak-to-peak case-to-coil motion. The response of the geophone with a 500 ohm coil is 2.1 volts/inch second and dampens to 70% of critical with an 810 ohm load or to critical with an impedance match.

Accordingly, it can be seen that a small, stable, two-cycle per second geophone has been produced by utilizing the novel spring suspension system of the present invention. Lower frequency geophones may be produced by utilizing the multiple spring suspension system of the present invention.

From the foregoing it can be seen that this invention is one well adapted to attain all the ends and objects hereinabove set forth, together with other advantages which are obvious and which are inherent to the apparatus.

It will be understood that certain features and subcombinations are of the utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A low-frequency, moving coil, electromagnetic seismometer, comprising a permanent magnet having an annular magnetic air-gap, an inertial mass, a coil secured to the inertial mass forming a mass-coil assembly, a spring suspension system concentrically suspending the mass-coil assembly in the annular air-gap in such a manner that the mass-coil assembly has freedom of movement coaxial with the axis of the annular air-gap, the spring suspension system being formed of at least three spring-spiders with no two of the spring-spiders being capable of supporting the mass-coil assembly without the stress therein exceeding the proportional limit of the springs.

2. The seismometer specified in claim 1 wherein there is a plurality of spring spiders at each end of the coil assembly.

3. A low-frequency, moving coil, electromagnetic geophone comprising: a support rod assembly, a permanent magnet assembly having a pair of opposed annular air-gaps mounted on the support rod assembly, a mass-coil assembly formed of a hollow cylindrical mass surrounding the magnet assembly and a pair of annular bobbins having a coil thereon, one bobbin located at each end of the hollow cylindrical mass positioning the coils in the annular air-gaps, a spring suspension system supporting the mass-coil assembly, the spring suspension system formed of a plurality of spaced spring-spiders located at each end of the mass-coil assembly, each spring-spider formed of an initial flat disk having a central portion and an outer peripheral portion and a plurality of spring arms connecting the central portion with the outer peripheral portion, said disk being preformed to provide the required deflection rate and returning to a flat position upon assembly with the mass-coil assembly, the central portion of the spring-spider having an aperture, the spring-spiders being telescoped over the support rod, spacers between each spring-spider, the outer periphery of the spring-spiders being positioned in the ends of the hollow cylinder outboard of the coil spacers beitween each spring-spider, means securing the spaced spring-spider assemblies to the hollow cylindrical mass, a cup-shaped casing having an axial aperture, one end of the support rod assembly positioned in the aperture, and a cover plate to close the open end of the casing having an axial aperture, the other end of the support rod assembly positioned in the aperture in the plate.

4. The geophone specified in claim 3 characterized in that the contact rod assembly is a conductor and the contact rod assembly is insulated from the casing and cover plate and is formed of an assembly of cylindrical conducting and insulating elements whereby the signals produced by the coils are transmitted by the contact rod assembly.

5. The transducer of claim 2 in which the thickness of the spring spiders is a fraction of the thickness of any one spring of the same strength material that could support the weight of the second element without exceeding a given preselected stress that is less than the proportional elastic limit of the spring material, said fraction being $1/\sqrt[3]{n}$ where $n$ is the number of spring spiders used.

6. The transducer of claim 2 in which the number of spring spiders used varies with the weight of the second element divided by the cube of the thickness of a single spring that can support the second element through the same deflection with the maximum stress produced therein being less than the proportional limit of the material of the springs.

7. A transducer comprising first and second elements and a spring suspension system connected to said first and second elements for supporting said second element for straight line movement relative to the first element, said spring suspension system including at least three spring spiders with each spring spider being incapable of supporting more than one half the weight of the second element without exceeding the proportional limit of the material from which it is made.

8. The transducer of claim 7 in which the thickness of the spring spiders is a fraction of the thickness of any one spring of the same strength material that could support the weight of the second element without exceeding a given preselected stress that is less than the proportional elastic limit of the spring material, said fraction being $1/\sqrt[3]{n}$ where $n$ is the number of spring spiders used.

9. The transducer of claim 7 in which the number of spring spiders used varies with the weight of the second element divided by the cube of the thickness of a single spring that can support the second element through the same deflection with maximum stress produced therein being less than the proportional limit of the material of the springs.

10. The transducer of claim 7 in which an even number of spring spiders are used.

11. The transducer of claim 7 in which the number of spring spiders is eight.

12. A low frequency, moving coil, electromagnetic seismometer, comprising a permanent magnet element, a coil element, and spring suspension means for mounting one of the elements for relative straight line movement of the coil through the magnetic field of the magnet due to the inertia of one of the elements when the other element is moved by seismic shocks or the like, said spring suspension system including at least three diaphragm spring type spiders with each spring spider having its center portion preformed out of the plane of the spring substantially the distance its proportionate share of the weight of the inertial element will deflect it so that the center portion of the spring will be returned into substantial alignment with the plane of the spring spider when supporting the inertial element.

13. The seismometer of claim 12 in which said spring suspension system includes two spaced groups of equal numbers of said spring spiders.

14. The seismometer of claim 13 in which there are four spring spiders in each group.

References Cited

UNITED STATES PATENTS

| | | | |
|---|---|---|---|
| 2,751,573 | 6/1956 | Millington | 340—17 |
| 3,344,397 | 9/1967 | Elliott et al. | 340—17 |

RODNEY D. BENNETT, JR., *Primary Examiner.*

CHARLES E. WANDS, *Assistant Examiner.*